United States Patent [19]
Affa

[11] Patent Number: 4,777,361
[45] Date of Patent: Oct. 11, 1988

[54] ENCASED POSITION MEASURING INSTRUMENT

[75] Inventor: Alfred Affa, Stein, Fed. Rep. of Germany

[73] Assignee: Dr. Johannes Heidenhain GmbH, Traunreut, Fed. Rep. of Germany

[21] Appl. No.: 74,526

[22] Filed: Jul. 16, 1987

[30] Foreign Application Priority Data

Aug. 6, 1986 [DE] Fed. Rep. of Germany ... 8621056[U]

[51] Int. Cl.$^4$ ............................................. G01B 11/00
[52] U.S. Cl. ................................ 250/239; 250/237 G; 74/18.2
[58] Field of Search ............. 250/237 G, 231 SE, 239; 340/347 P; 356/375; 74/18, 18.1, 18.2; 269/164; 29/271

[56] References Cited

U.S. PATENT DOCUMENTS

| | | | |
|---|---|---|---|
| 3,051,515 | 8/1962 | Graves | 74/18.2 |
| 4,387,300 | 6/1983 | Dudash et al. | 250/239 |
| 4,405,859 | 9/1983 | Kling et al. | 250/239 |
| 4,607,956 | 8/1986 | Ishihara et al. | 250/237 G |
| 4,718,284 | 1/1988 | Pfeiffer | 74/18.2 |

FOREIGN PATENT DOCUMENTS

3613755A1 10/1985 Fed. Rep. of Germany .
8622076 11/1986 Fed. Rep. of Germany .

OTHER PUBLICATIONS

Gekapseltes Universal-Langenmess-System Walzspalt-Mess-System, Feb. 1982.

Primary Examiner—Edward P. Westin
Assistant Examiner—Charles F. Wieland
Attorney, Agent, or Firm—Willian Brinks Olds Hofer Gilson & Lione Ltd.

[57] ABSTRACT

An encased position measuring instrument for measuring the relative position of two objects comprises a housing, a measuring scale and a scanning unit. The measuring scale is scanned by the scanning unit which is connected to a fastening member by means of a connecting rod. The connecting rod moves through a frontal opening in the housing which is hermetically sealed by a sealing unit. To avoid undesirable constraining forces exerted on the connecting rod when the housing changes position, the sealing unit is fastened to the housing by means of rods or wires. These rods run parallel to the connecting rod and are rigid in the measuring direction but allow movement of the sealing unit at right angles to the measuring direction.

14 Claims, 2 Drawing Sheets

ENCASED POSITION MEASURING INSTRUMENT

BACKGROUND OF THE INVENTION

The present invention relates to an encased position measuring instrument for measuring the relative position of two objects comprising a measuring scale, a scanning unit, a housing, a connecting element extending through the housing, and means for sealing the connecting element to the housing.

Position measuring instruments of this type are frequently used on numerically controlled machining equipment for determining the relative position of a workpiece and tool. Generally, the scanning unit is fastened to one of the objects and the measuring scale is fastened to the other of the objects. The attachment is such that relative movement between the two objects results in relative movement between the measuring scale and the scanning unit.

A position measuring instrument of this type is disclosed in a brochure published by Dr. Johannes Heidenhain GmbH, Traunreut, West Germany, entitled "Encased Universal Longitudinal Measuring System ULS, Roll Opening Measuring System WMS", February 1982 edition. The instrument comprises a housing opening for the passage of a connecting rod. A sealing unit seals the opening between the housing and the connecting rod. The sealing unit is fastened to the by means of a plastic tubing extending in the measuring direction. The plastic tubing enables the sealing unit to move in directions perpendicular to the measuring direction, but to not move in the measuring direction. The sealing unit is maintained rigid in the measuring direction by a relatively thick sidewall of the tubing. This, however, creates a disadvantage in that, when changing the position of the housing and sealing unit relative to the connecting rod, constraining forces, perpendicular to the direction of measurement, may be exerted on the connecting rod. These forces may bend the connecting rod and lead to displacement of the scanning unit and measurement errors. Further, uneven radial constraining forces applied by th connecting rod to the sealing unit may result in an incomplete sealing of the housing opening.

It is an object of the present invention to provide an encased position measuring instrument of the above-mentioned type which yields a high degree of measurement accuracy and provides a means of securely sealing the opening between the housing and the connectnng rod.

SUMMARY OF THE INVENTION

The present invention is directed to an encased position measuring device wherein the passage of the connecting element through the housing is sealed by means which allow movement of a sealing unit in directions substantially nonparallel to the measuring direction.

According to a preferred embodiment of this invention, a measuring instrument is provided which comprises a housing, a measuring scale, a scanning unit for scanning the measuring scale, and a connecting rod. The connecting rod passes through an opening in the housing to connect the scanning unit with one of the objects. The opening between the connecting rod and the housing is sealed by a sealing unit. The sealing unit is fastened to the housing by three wires which are rigid in the measuring direction and concentrically mounted about the connecting rod. The wires hold the sealing unit rigid in the measuring direction while allowing some sideways movement without applying significant perpendicular forces to the connecting rod.

A particular advantage of the present invention is that the sealing unit is stably held relative to the housing in the measuring direction while angular movements and parallel displacements of the sealing unit relative to the housing are accommodated without generating undesirable constraining forces on the connecting element and/or the sealing unit. This manner of sealing the instrument housing promises a high degree of measurement accuracy.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
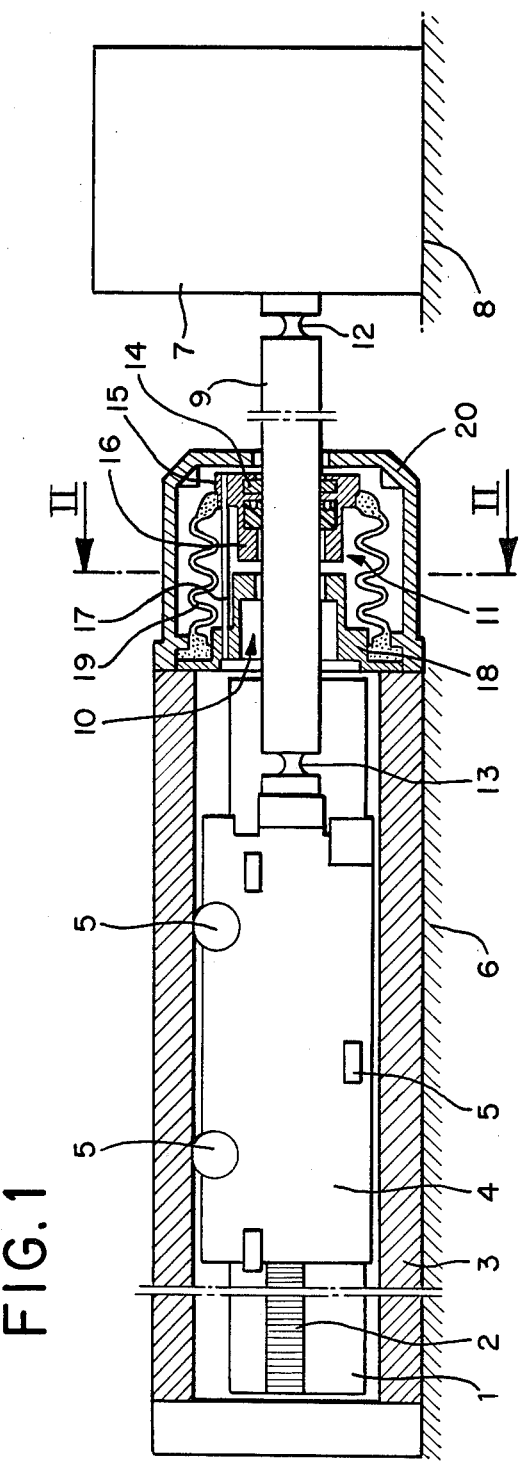
FIG. 1 shows a partial cross-sectional representation of an encased position measuring instrument of a first preferred embodiment of the present invention.
Figure 2:
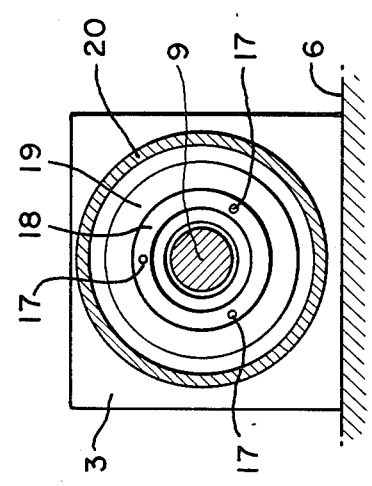
FIG. 2 is a sectional representation of the embodiment shown in FIG. 1 taken along lines II—II.

Turning now to the drawings, FIGS. 1 and 2 show sectional representations of a first preferred embodiment. The embodiment comprises a housing 3, a measuring scale, and a scanning unit 4. The measuring scale is comprised of a glass graduation 1 and an incremental interval spacing 2. The measuring scale is glued into the housing 3 and scanned by the scanning unit 4 to produce a measuring signal. The scanning unit 4 is conducted along the graduation 1 and inner surface of the housing 3 by substantially frictionless rollers 5.

The housing 3 is connected to the machine base 6 and the scanning unit 4 is connected by means of a connecting rod 9 and fastening member 7 to the machine cradle 8. The connecting rod 9 passes through the housing 3 by means of a frontal housing opening 10. The connecting rod 9 transfers the movements of the machine cradle 8 in the measuring direction to the scanning unit 4 so that the relative movements between the machine parts may be measured.

The opening 10 between the housing 3 and the connecting rod 9 is hermetically sealed with a sealing unit 11. The sealing unit 11 protects the scanning unit 4 and the incremental interval spacing 2 from damaging environmental influences such as dust and moisture.

During normal use, the connecting rod 9 may become misaligned in the direction perpendicular to the measuring direction. In addition, misalignments perpendicular to the longitudinal extension of the connecting rod 9, as well as angular displacements, may result during mounting of the housing 3 onto the machine base 6 and/or during mounting of the fastening member 7 onto the machine cradle 8. To prevent these misalignments from disrupting the operation of the instrument, joints 12, 13 are used to connect the scanning unit 4 with the fastening member 7. The joints 12, 13 are rigid in the measuring direction and are formed of weak points or regions. Joint 12 connects one end of the connecting rod 9 to the fastening member 7. Joint 13 connects the other end of the connecting rod 9 to the scanning unit 4. This connection precludes any disturbing constraining forces from being exerted on the scanning unit 4 during the course of assembly and/or during the measuring process itself. The joints 12, 13 permit only minimal relative movements—angular movements as well as movements perpendicular to the measuring direction—between the attaching member 7 and the scanning unit 4 as the connecting rod is passed through the housing.

The sealing unit 11 is movably anchored to the housing 3. The movable anchoring assures a secure sealing of the housing opening 10 even in the event of displacement of the connecting rod 9. The sealing unit 11 consists of a stripping device 14 and a sealing ring 15 which are located in a holder 16. The holder 16 is fastened to the housing 3 by means of three wires 17 via an intermediate piece 18. The three wires 17 are rigid in the measuring direction and are arranged concentrically about the housing opening 10 with a relative displacement of 120°. The sealing unit 11 absorbs frictional forces between the connecting rod 9 and the sealing unit 11 and allows radial movements of the connecting rod 9 without exerting significant lateral forces on the connecting rod 9. A skin 19, flexible in all directions, is present in the area of the wire 17, between the holder 16 and the housing 3, to seal the area. To protect against splinters and the like, the sealing unit 11 and the skin 19 are surrounded by a metal protective hood 20 fastened to the housing 3.

It should be understood that, although not shown, the connection of the sealing unit 11 with the housing 3 can also be carried out by means of a single wire. Of course, two wires displaced from one another by 180° may alternately be used.

In addition, rods may be used as connecting elements instead of the wires. Each rod may comprise one or more, and preferably two, weak points spaced from one another in the measuring direction. The weak points, or regions, serve as joints to allow some degree of movement in directions other than the measuring direction.

Further, the rods can also connect the housing and the scanning unit in an angularly movable manner by means of ball bearings.

Figure 4:
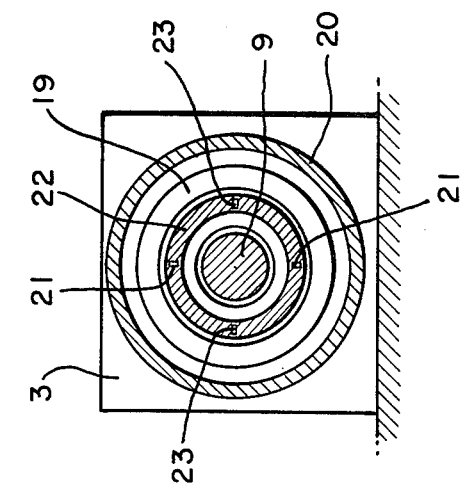
FIG. 4 is a sectional representation of the embodiment shown in FIG. 3 taken along lines IV—IV.
Figure 3:
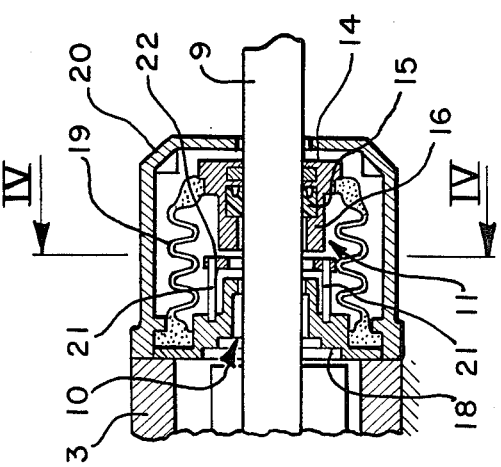
FIG. 3 is a partial cross-sectional representation of an encased position measuring instrument of a second preferred embodiment of the present invention.

A second preferred embodiment of the present invention is shown in FIGS. 3 and 4. In these figures, the elements which are similar in function and structure to the elements shown in FIGS. 1 and 2 will be designated by like reference numerals.

In the second embodiment, two leaf springs 21 are positioned around the opening 10 and angularly displaced from one another by 180°. Each leaf spring 21 is fastened at one end to the housing 3 by means of an intermediate piece 18. The other end of each leaf spring 21 is fastened to a ring 22. The leaf springs 21 constitute a first joint, and are arranged to lie parallel to the measuring direction in a first plane. Two additional leaf springs 23 constitute a second joint, and are arranged parallel to the measuring direction in a second plane which is perpendicular to the first plane. One end of each leaf spring 23 is connected to the ring 22 and the other end of each leaf spring 23 is connected to the sealing unit 11. The leaf springs 21, 23 are oriented such that their longitudinal axes run parallel to the longitudinal axis of the housing 3.

The first leaf springs 21 permit angular movement of the sealing unit 11 perpendicular to the measuring direction. The second leaf springs 23, which are arranged at 90° relative to the first leaf springs 21, permit additronal angular movement perpendicular to the measuring direction and perpendicular to the first angular movement. This means that relative movements—angular movements and/or parallel displacements—of the sealing unit 11 relative to the housing 3 are possible in all directions (except in the measuring direction) without causing any disturbing constraining forces to be exerted on the connecting rod 9. Rigidity in the measuring direction is assured by the leaf springs 21, 23. The additional protective features consisting of a skin 19 and a protective hood 20 can also be used to enclose the leaf springs 21, 23 in this second preferred embodiment.

It should of course be understood that buckle-proof wires or rods with joints running in a direction parallel to the measuring direction can also be used in place of the leaf springs.

It should also be understood that the present invention is not limited to the type of measuring device shown. The present invention may be used on other measuring devices including capacitive, magnetic and inductive mechanisms of incremental or absolute instrument types.

Of course, it should also be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. An improved encased measuring device for measuring the relative position of two objects movable relatively to one another, the measuring device of the type comprising a housing attached to one of the two objects; a measuring scale mounted to the housing; a scanning unit operative to scan the measuring scale to produce at least one measuring signal; a connecting element adapted to connect the scanning unit to the other of the two objects and passing through an opening in the housing, the connecting element such that relative movement of the two objects produces relative movement between the scanning unit and the measuring scale, the movement of the connecting element defining a measuring direction, the improvement comprising:

means for sealing the opening between the connecting element and the housing; and means for positioning the means for sealing with respect to the housing such that the means for sealing is substantially rigid with respect to the housing in the direction of movement of the connecting rod and substantially movable in directions nonparallel to the direction of movement of the connecting element.

2. The invention of claim 1 wherein the means for positioning comprises three rod-shaped elements concentrically arranged with respect to the connecting rod and spaced equidistantly from one another.

3. The invention of claim 1 wherein the means for positioning comprises:

an attachment member concentrically located about the connecting rod;

a first pair of leaf springs oriented to lie in a first plane and positioned on opposite sides of the connecting element, one end of each leaf spring connected to the housing and the other end of each leaf spring connected to the attachment member; and a second pair of leaf springs oriented to lie in a second plane perpendicular to the first plane and positioned on opposite sides of the connecting element, one end of each leaf spring connected to the attachment member and the other end of each leaf spring connected to the means for sealing.

4. An improved encased position measuring device for measuring the relative position of two objects movable relatively to one another, the measuring device of the type comprising a housing attached to one of the two objects; a measuring scale mounted to the housing; a scanning unit operative to scan the measuring scale to produce at least one measuring signal; a connecting element passing through an opening in the housing and adapted to connect the scanning unit to the other of the two objects, the connecting element such that relative movement of the two objects produces relative movement between the scanning unit and the measuring scale, the relative movement defining a measuring direction, the improvement comprising:

a sealing unit to seal the opening between the housing and the connecting element;

an elongated element defining a longitudinal axis and oriented such that the longitudinal axis extends in the direction of movement of the connecting element, the elongated element rigidly connecting the sealing unit to the housing in the measuring direction while allowing the sealing unit to move in directions other than in the measuring direction.

5. The invention of claim 4 wherein the sealing unit is fastened to the housing by at least three elongated elements mounted concentrically about the opening in the housing and spaced equidistantly from one another.

6. The invention of claim 4 wherein the elongated element is pliable except in the direction of movement of the connecting element.

7. The invention of claim 4 wherein the elongated element comprises two separated regions of reduced resistance to forces in directions other than in the direction of movement of the connecting element.

8. The invention of claim 4 wherein the invention further comprises:

a support collar concentrically positioned about the connecting element;

a first pair of biasing elements, each element defining a longitudinal axis and operative to produce biasing forces in directions substantially nonaligned with their longitudinal axis, one end of each biasing element fastened to the support collar and the other end fastened to the housing, the first biasing elements oriented in a first plane and positioned on either side of the connecting element; and a second pair of biasing elements, each element defining two ends and a longitudinal axis and operative to produce biasing forces in directions substantially nonaligned with their longitudinal axis, one end of each biasing element fastened to the support collar and the other end fastened to the sealing unit, the second biasing elements oriented in a second plane substantially non-parallel to the first plane, the second biasing elements positioned on either side of the connecting element;

the first and second pairs of biasing elements and the support collar operative to allow swivelling movement and parallel displacement of the sealing unit relative to the housing but to not allow substantial movement of the sealing unit in the measuring direction.

9. The invention of claim 8 wherein at least one biasing element is a leaf spring.

10. The invention of claim 8 wherein at least one biasing element is a rod-shaped element.

11. The invention of claim 8 wherein at least one biasing element is a buckle-proof wire.

12. The invention of claim 4 wherein the elongated element is mounted at at least one end by a swivel joint.

13. The invention of claim 12 wherein the swivel joint is a ball and socket joint.

14. The invention of claim 4 wherein the elongated element is mounted by means of a ball bearing.

* * * * *

UNITED STATES PATENT AND TRADEMARK OFFICE
CERTIFICATE OF CORRECTION

PATENT NO. : 4,777,361
DATED      : October 11, 1988
INVENTOR(S) : Alfred Affa

It is certified that error appears in the above-identified patent and that said Letters Patent is hereby corrected as shown below:

In column 1, line 29, after the second occurrence of "the", please insert --housing--.

In column 1, line 43, please delete "th" and substitute therefor --the--.

In column 4, line 4, please delete "addittonal" and substitute therefor --additional--.

Signed and Sealed this

Thirtieth Day of July, 1991

Attest:

HARRY F. MANBECK, JR.

Attesting Officer

Commissioner of Patents and Trademarks